(12) United States Patent
Hsiao

(10) Patent No.: US 8,138,405 B2
(45) Date of Patent: Mar. 20, 2012

(54) STRAIGHT-THROUGH ROTARY VALVE STRUCTURE

(76) Inventor: Kuo-Ming Hsiao, Taoyuan County (TW)

( * ) Notice: Subject to any disclaimer, the term of this patent is extended or adjusted under 35 U.S.C. 154(b) by 143 days.

(21) Appl. No.: 12/767,098

(22) Filed: Apr. 26, 2010

(65) Prior Publication Data

US 2010/0275759 A1  Nov. 4, 2010

(30) Foreign Application Priority Data

May 1, 2009  (TW) ............................... 98207419 U

(51) Int. Cl.
G10D 9/04 (2006.01)
(52) U.S. Cl. .............................. 84/396; 84/395; 84/394
(58) Field of Classification Search .............. 84/394–396
See application file for complete search history.

(56) References Cited

U.S. PATENT DOCUMENTS

| 3,641,863 | A | * | 2/1972 | Kanstul et al. | 84/390 |
| 4,213,371 | A | * | 7/1980 | Thayer | 84/390 |
| 4,299,156 | A | * | 11/1981 | Thayer | 84/390 |
| 4,469,002 | A | * | 9/1984 | Thayer | 84/390 |
| 4,905,564 | A | * | 3/1990 | Thayer | 84/390 |
| 5,396,825 | A | * | 3/1995 | Kirts | 84/390 |
| 5,686,678 | A | * | 11/1997 | Greenhoe | 84/390 |
| 5,798,471 | A | * | 8/1998 | Miller | 84/390 |
| 5,900,563 | A | * | 5/1999 | Leonard | 84/390 |
| 5,965,833 | A | * | 10/1999 | Lindberg | 84/390 |
| 6,018,115 | A | * | 1/2000 | Leonard | 84/390 |
| 6,255,571 | B1 | * | 7/2001 | Takahashi | 84/388 |
| 7,112,735 | B2 | * | 9/2006 | Shire | 84/395 |
| 2010/0147134 | A1 | * | 6/2010 | Griego | 84/395 |
| 2010/0275759 | A1 | * | 11/2010 | Hsiao | 84/396 |

* cited by examiner

Primary Examiner — Elvin G Enad
Assistant Examiner — Robert W Horn
(74) Attorney, Agent, or Firm — Rosenberg, Klein & Lee

(57) ABSTRACT

A straight-through rotary valve structure includes: a case having an internal conic receiving space with an opening, a first extension section being disposed at a tip of the receiving space, a second extension section being disposed beside the first extension section; a conic rotary valve block having a pivot shaft and formed with a first hole and a second hole, the first hole communicating with a third hole formed at a tip of the rotary valve block in communication with the first extension section, the second hole communicating with a fourth hole formed on a conic face of the rotary valve block; and an outer cover blocking the opening of the case. The outer cover is formed with a central shaft hole through which the pivot shaft passes. The outer cover is further formed with a first perforation and a second perforation corresponding to the first and second holes respectively.

20 Claims, 6 Drawing Sheets

STRAIGHT-THROUGH ROTARY VALVE STRUCTURE

BACKGROUND OF THE INVENTION

1. Field of the Invention

The present invention relates generally to an improved straight-through rotary valve structure, and more particularly to a rotary valve structure of a trombone, which has lower frictional wear and is easy to maintain and operate.

2. Description of the Related Art

The trombone is a brass instrument. Please refer to FIG. 1, which shows the structure of a conventional trombone. The trombone mainly has a telescopic slide 40, two inner tubes 4 arranged in parallel to each other, a rotary valve main body A, a main tuning tube 5 and a tuning loop 50. The telescopic slide 40 is a crooked tube body telescopically fitted with first ends of the inner tubes 4. A mouthpiece 41 is connected to a second end of one of the inner tubes 4. A second end of the other of the inner tubes 4 is connected to an inlet of the rotary valve main body A. Two ends of the tuning loop 50 are connected to the rotary valve main body A. The main tuning tube 5 is connected between an outlet of the rotary valve main body A and a bell 51.

Referring to FIGS. 2 to 4, the rotary valve main body A is composed of a case 10, a rotary valve block 20 and an outer cover 30. The case 10 is formed with an internal conic receiving space 11 with an opening. A first extension section 12 (the outlet) is disposed on a bottom of the receiving space 11 for connecting with the main tuning tube 5. In addition, a second extension section 14 is disposed on the case 10 beside the first extension section 12 for connecting with one end of the tuning loop 50. The rotary valve block 20 is a conic body. A pivot shaft 23 is disposed at a center of a bottom section of the rotary valve block 20. The rotary valve block 20 is formed with a first flow way 21 and a second flow way 22 positioned on two sides of the pivot shaft 23. The first and second flow ways 21, 22 extend to a tip and a lateral side of the rotary valve block 20 respectively. One end of the first flow way 21 is connected to the first extension section 12, while one end of the second flow way 22 is connected to the second extension section 14. The outer cover 30 is secured to the case 10 by a retainer ring 34 to block the opening of the receiving space 11. The outer cover 30 is formed with a central shaft hole 33 passing through the outer cover 30. The pivot shaft 23 extends through the shaft hole 33 and protrudes outward from the outer cover 30. The outer cover 30 is further formed with a first perforation 31 and a second perforation 32 beside the shaft hole 33. The inner tube 4 is connected to the first perforation 31. The other end of the tuning loop 50 is connected to the second perforation 32. In practice, when the trombone is played in a common tune, a player blows airflow through the mouthpiece 41 into the inner tube 4. The airflow flows through the telescopic slide 40 back to the other inner tube 4 and then flows through the first flow way 21 of the rotary valve block 20 and the first extension section 12 of the case 10 to the main tuning tube 5. The airflow eventually comes out from the bell 51 to make sounds from the bell 51. The telescopic slide 40 can be slid to vary the length of the path of airflow so as to change the pitches. When tuned up or down, the player can shift an external switch to drive the rotary valve block 20 via the pivot shaft 23. In this case, the airflow flowing out from the inner tube 4 can flow through the second flow way 22 to the turning loop 50 and then flow through the first flow way 21 and the main tuning tube 5 to come out from the bell 51. Accordingly, the airflow will flow through the tuning loop 50 and the length of the path of airflow is lengthened to change the tune of the trombone.

In practical use, the above conventional trombone has some defects as follows:

1. The conic face of the rotary valve block 20 contacts with the inner conic face of the receiving space 11 of the case 10 with a very large frictional force therebetween. In case of poor maintenance or improper operation, it will be hard to smoothly operate the rotary valve block 20.
2. There is a very large frictional force between the rotary valve block 20 and the case 10 so that it is necessary to apply a grease between the rotary valve block 20 and the case 10 to reduce the frictional force therebetween. This complicates the maintenance process and causes inconvenience in use of the trombone.
3. When playing the trombone, the saliva of the player is easy to infiltrate between the rotary valve block 20 and the case 10. The saliva must be cleared up in time. Otherwise, the rotary valve block 20 and the case 10 are very likely to rust and damage.

SUMMARY OF THE INVENTION

It is therefore a primary object of the present invention to provide an improved straight-through rotary valve structure. At least one valve block bearing is disposed between the case and the rotary valve block of the rotary valve structure to reduce rotational friction therebetween. Therefore, the rotary valve structure has lower frictional wear and is easier to operate.

It is a further object of the present invention to provide the above straight-through rotary valve structure, in which the bearing is durable and easy to maintain. Therefore, it is unnecessary to apply any grease between the rotary valve block and the case so that the maintenance process is simplified to facilitate the use.

To achieve the above and other objects, the straight-through rotary valve structure of the present invention includes: a case formed with an internal conic receiving space with an opening, a first extension section being disposed at a tip of the receiving space in communication with an exterior of the case, a bearing seat being disposed on an inner side of the first extension section for receiving a valve block bearing, a second extension section being disposed on the case beside the first extension section; a conic rotary valve block, a pivot shaft being disposed at a center of a bottom section of the rotary valve block, the rotary valve block being formed with a first hole and a second hole positioned beside the pivot shaft, via a first flow way, the first hole communicating with a third hole formed at a tip of the rotary valve block in communication with the first extension section, via a second flow way, the second hole communicating with a fourth hole formed on a conic face of the rotary valve block, the valve block bearing being fitted around the third hole of the rotary valve block; and an outer cover secured to the case to block the opening of the case. The outer cover is formed with a central shaft hole through which the pivot shaft passes. The outer cover is further formed with a first perforation and a second perforation beside the shaft hole corresponding to the first and second holes respectively.

In the above straight-through rotary valve structure, a bearing seat is disposed in the shaft hole of the outer cover and a pivot shaft bearing is tightly fitted on the pivot shaft and received in the bearing seat of the outer cover.

The present invention can be best understood through the following description and accompanying drawings, wherein:

DETAILED DESCRIPTION OF THE PREFERRED EMBODIMENT

Figure 5:
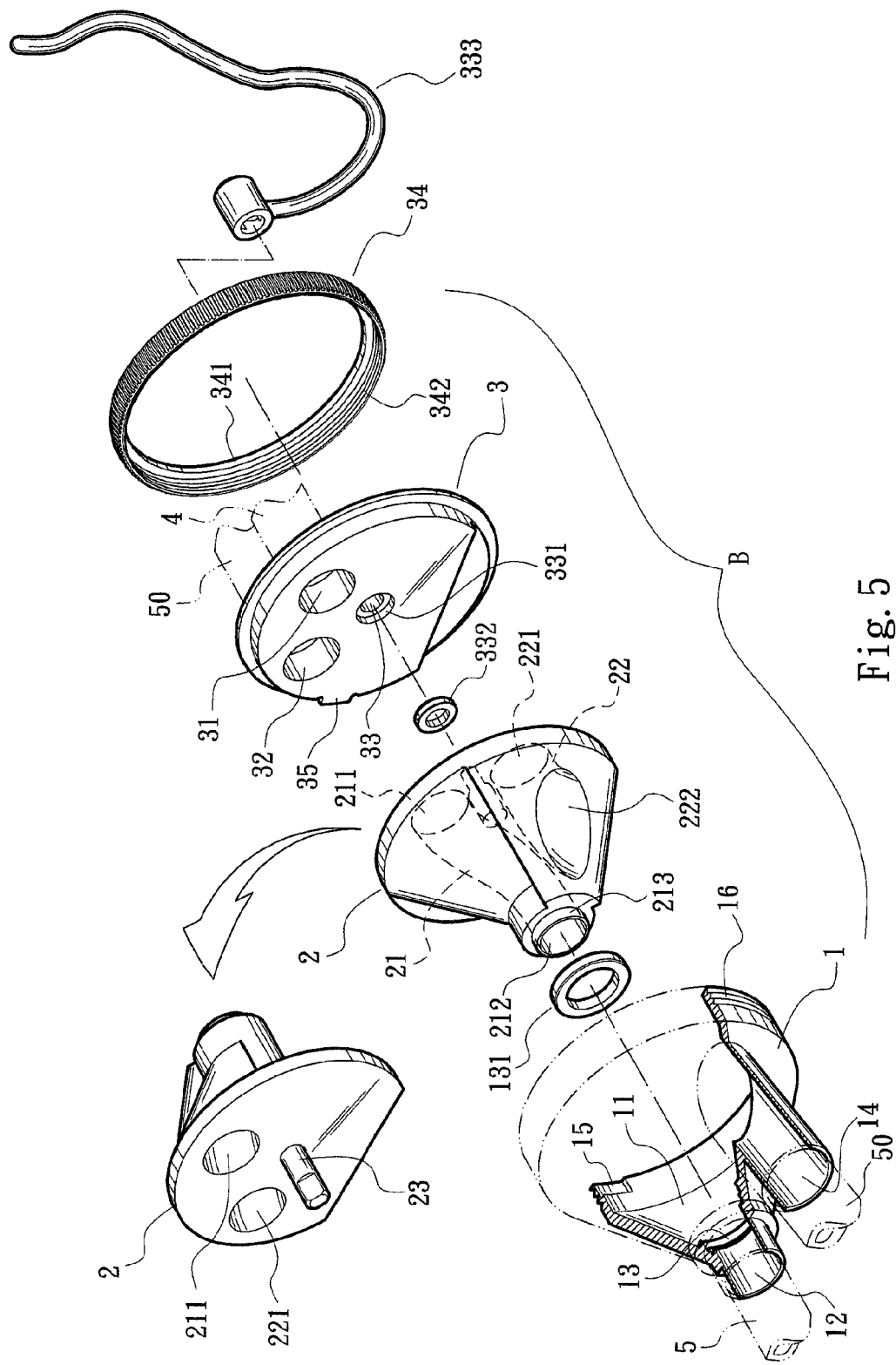
FIG. 5 is a perspective exploded view of the straight-through rotary valve structure of the present invention.
Figure 6:
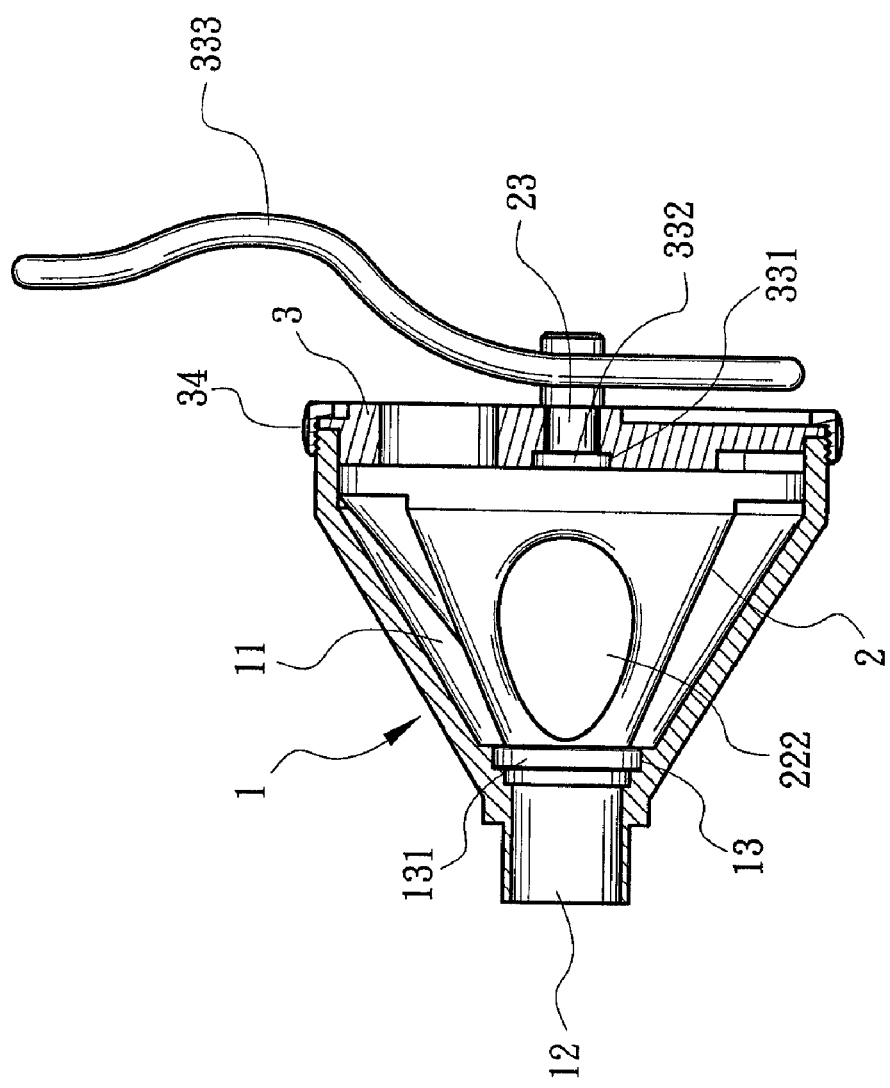
FIG. 6 is a sectional assembled view of the straight-through rotary valve structure of the present invention.

Please refer to FIGS. 5 and 6. The straight-through rotary valve structure B of the present invention includes a case 1, a rotary valve block 2 and an outer cover 3. The case 1 is formed with an internal conic receiving space 11 with an opening. A tubular first extension section 12 is disposed at a tip of the receiving space 11 in communication with an exterior of the case 1 for connecting with a main tuning tube 5 of a trombone. A bearing seat 13 is disposed on an inner side of the first extension section 12 for receiving a valve block bearing 131. In addition, a second extension section 14 is disposed on the case 1 beside the first extension section 12 for externally connecting with one end of a tuning loop 50. A locating recess 15 is formed on an inner circumference of the opening of the receiving space 11. In addition, an outer thread 16 is formed on an outer circumference of the opening. The rotary valve block 2 is a conic body. A pivot shaft 23 with a cut face is disposed at a center of a bottom section of the rotary valve block 2. The rotary valve block 2 is formed with a first hole 211 and a second hole 221 positioned beside the pivot shaft 23 on the same radius. Via a first flow way 21, the first hole 211 communicates with a third hole 212 formed at a tip of the rotary valve block 2. A hub section 213 is disposed around the third hole 212. The valve block bearing 131 is fitted on the hub section 213 with the third hole 212 in communication with the first extension section 12. Via a second flow way 22, the second hole 221 communicates with a fourth hole 222 formed on a conic face of the rotary valve block 2. The outer cover 3 is secured to the case 1 to block the opening of the receiving space 11. A circumference of the outer cover 3 is formed with a locating protrusion 35, which can be inlaid in the locating recess 15 of the case 1. A retainer ring 34 with an inner thread 342 is screwed on the outer thread 16 of the case 1 and connected therewith. One end of the retainer ring 34 is formed with an inner annular flange 341 for pressing the circumference of the outer cover 3 to retain the outer cover 3. The outer cover 3 is formed with a central shaft hole 33 passing through the outer cover 3. The pivot shaft 23 extends through the shaft hole 33 to externally connect with a switch 333. The outer cover 3 is further formed with a first perforation 31 and a second perforation 32 beside the shaft hole 33 on the same radius corresponding to the first and second holes 211, 221 respectively. An inner tube 4 of the trombone is connected to the first perforation 31. The other end of the tuning loop 50 is connected to the second perforation 32.

Figure 1:
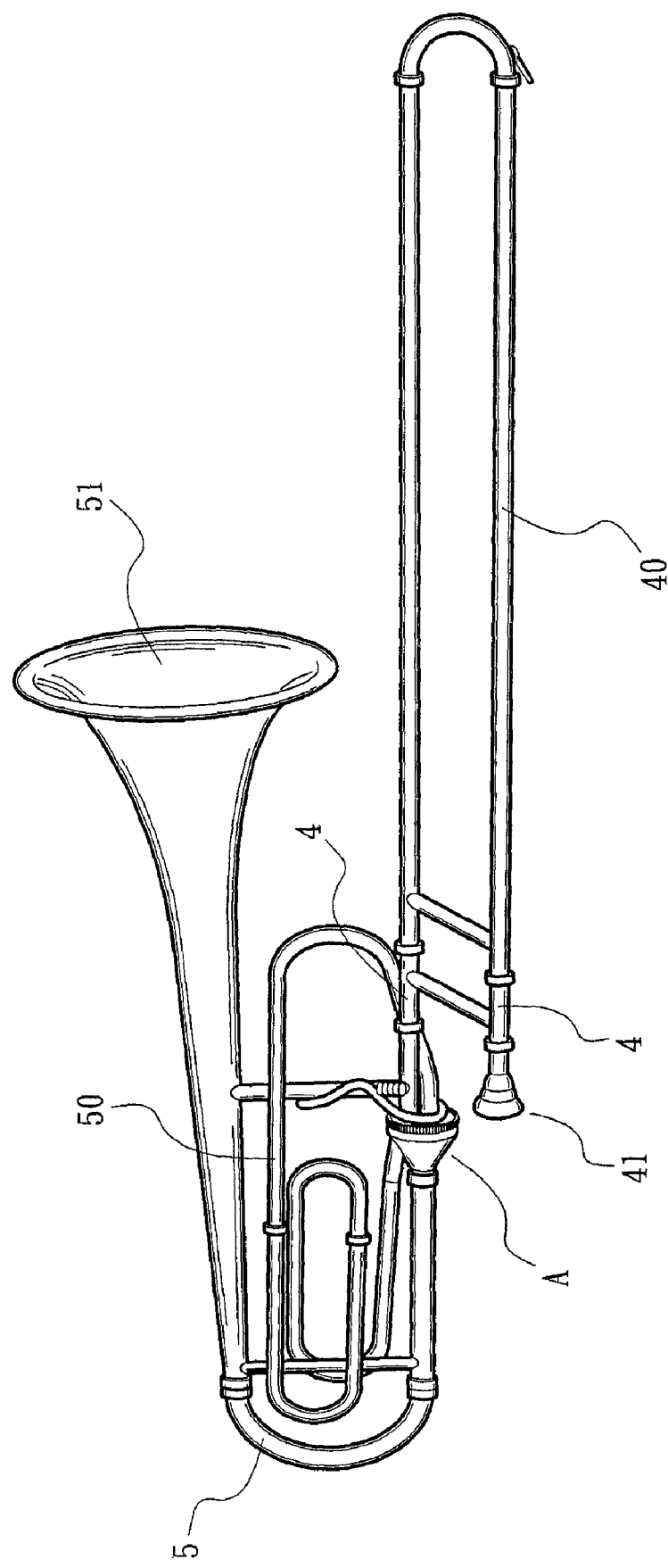
FIG. 1 is a perspective view of a conventional trombone.
Figure 2:
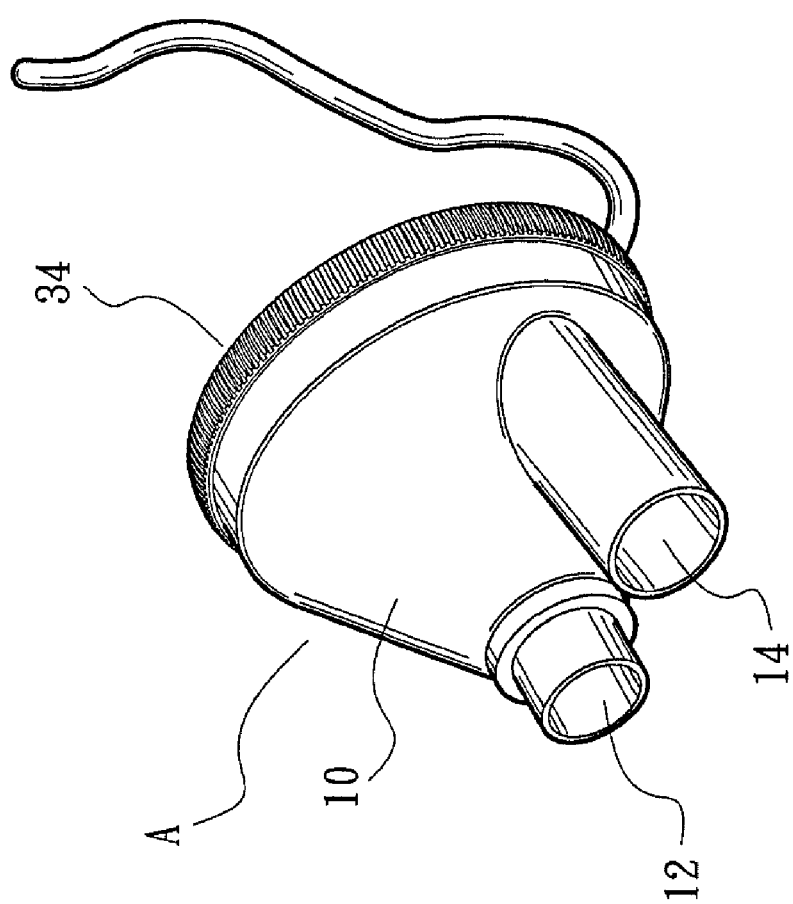
FIG. 2 is a perspective assembled view of a rotary valve main body of the conventional trombone.
Figure 3:
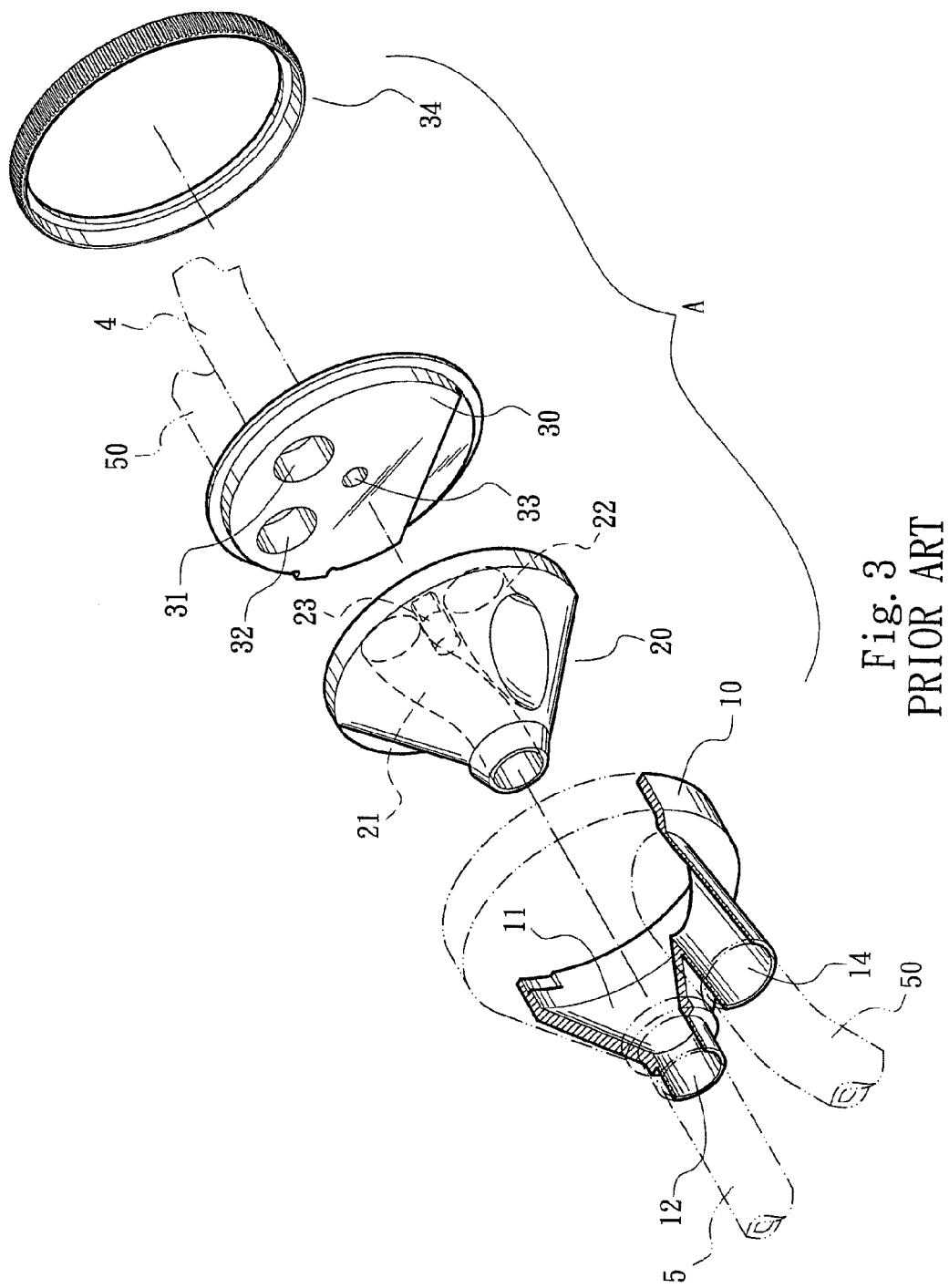
FIG. 3 is a perspective exploded view of the rotary valve main body of the conventional trombone according to FIG. 2.
Figure 4:
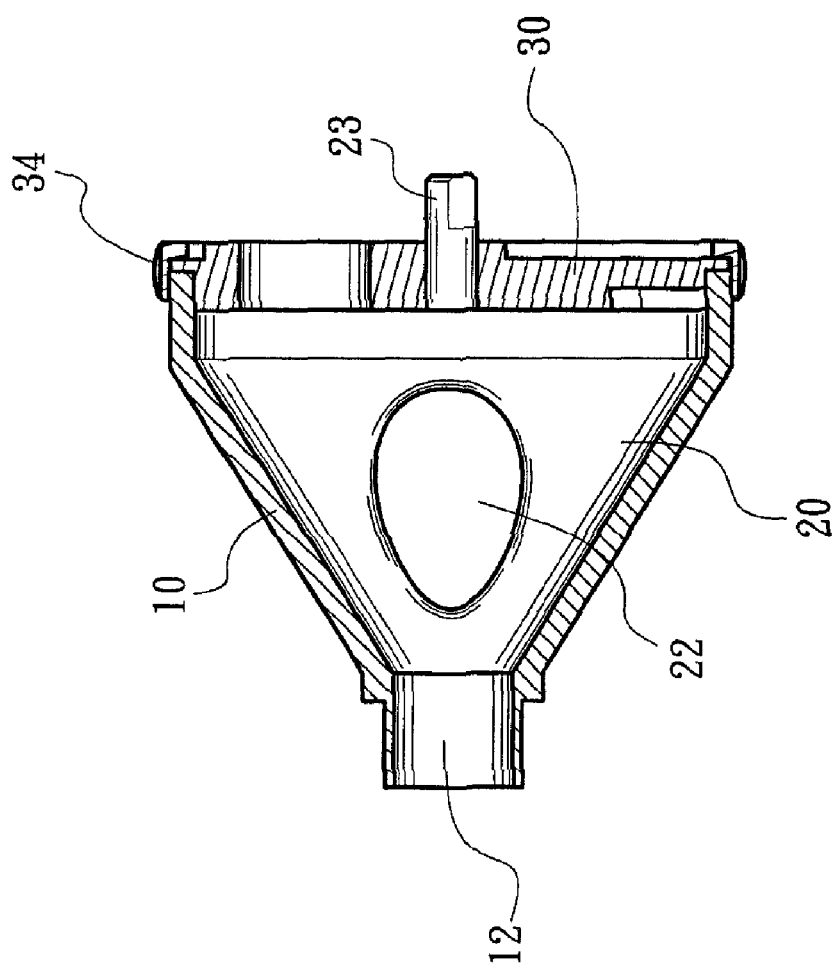
FIG. 4 is a sectional assembled view of the rotary valve main body of the conventional trombone according to FIG. 2.

In practical use of the trombone as shown in FIG. 1, in which the original rotary valve main body A is replaced with the rotary valve structure B of the present invention, in a natural state, the first hole 211 of the rotary valve block 2 communicates with the first perforation 31 of the outer cover 3. Under such circumstance, the fourth hole 222 of the rotary valve block 2 is blocked by the inner wall of the receiving space 11. At this time, a player can blow airflow through the mouthpiece 41 into the inner tube 4. The airflow flows through the telescopic slide 40 back to the other inner tube 4 and then flows through the first flow way 21 of the rotary valve block 2 and the first extension section 12 of the case 1 to the main tuning tube 5. The airflow eventually comes out from the bell 51 to make sounds from the bell 51. The telescopic slide 40 can be reciprocally slid to vary the length of the path of airflow so as to change the pitches. When shifting the switch 333, the rotary valve block 2 is driven via the pivot shaft 23 to communicate the first hole 211 with the second perforation 32 of the outer cover 3 and communicate the second hole 221 with the first perforation 31. In this case, the airflow flowing from the telescopic slide 40 back into the inner tube 4 can flow from the second flow way 22 of the rotary valve block 2 through the second extension section 14 to the turning loop 50 and then flow from the tuning loop 50 through the first flow way 21 and the first extension section 12 to the main tuning tube 5 to come out from the bell 51. In comparison with the conventional path of airflow, the path of airflow of the present invention is longer than the conventional path of airflow by the length of the tuning loop 50. Therefore, the tune of the trombone can be modulated.

According to the above arrangement, the straight-through rotary valve structure of the present invention has lower frictional wear and is easy to maintain and operate.

The above embodiment is only used to illustrate the present invention, not intended to limit the scope thereof. Many modifications of the above embodiment can be made without departing from the spirit of the present invention.

What is claimed is:

1. A straight-through rotary valve structure comprising:
  a case formed with a conic receiving space, a first extension section being disposed at a tip of the receiving space in communication with an exterior of the case, the receiving space having an opening on a bottom of the receiving space, a second extension section being disposed on the case beside the first extension section;
  a rotary valve block, which is a conic body, a pivot shaft being disposed at a center of a bottom section of the rotary valve block, the rotary valve block being formed with a first hole and a second hole positioned beside the pivot shaft, via a first flow way, the first hole communicating with a third hole formed at a tip of the rotary valve block in communication with the first extension section, via a second flow way, the second hole communicating with a fourth hole formed on a conic face of the rotary valve block; and
  an outer cover secured to the case to block the opening of the receiving space, the outer cover being formed with a central shaft hole passing through the outer cover, the pivot shaft passing through the shaft hole and extending outward, the outer cover being further formed with a first perforation and a second perforation beside the shaft hole corresponding to the first and second holes respectively, at least one of an inner side of the first extension section and the shaft hole of the outer cover being provided with a bearing seat for receiving a bearing therein, being connected with at least one of the tip of the rotary valve block and the pivot shaft of the rotary valve block.

2. The straight-through rotary valve structure as claimed in claim 1, wherein a pivot shaft bearing is tightly fitted on the pivot shaft and received in the bearing seat of the outer cover.

3. The straight-through rotary valve structure as claimed in claim 1, wherein a valve block bearing is fitted around the third hole of the rotary valve block and received in the bearing seat of the case.

4. The straight-through rotary valve structure as claimed in claim 2, wherein a valve block bearing is fitted around the third hole of the rotary valve block and received in the bearing seat of the case.

5. The straight-through rotary valve structure as claimed in claim 3, wherein a hub section is disposed around the third hole, the valve block bearing being fitted around the hub section.

6. The straight-through rotary valve structure as claimed in claim 4, wherein a hub section is disposed around the third hole, the valve block bearing being fitted around the hub section.

7. The straight-through rotary valve structure as claimed in claim 1, wherein a retainer ring is secured to the opening of the case, the retainer ring being formed with an inner annular flange for pressing a circumference of the outer cover to retain the outer cover.

8. The straight-through rotary valve structure as claimed in claim 2, wherein a retainer ring is secured to the opening of the case, the retainer ring being formed with an inner annular flange for pressing a circumference of the outer cover to retain the outer cover.

9. The straight-through rotary valve structure as claimed in claim 3, wherein a retainer ring is secured to the opening of the case, the retainer ring being formed with an inner annular flange for pressing a circumference of the outer cover to retain the outer cover.

10. The straight-through rotary valve structure as claimed in claim 4, wherein a retainer ring is secured to the opening of the case, the retainer ring being formed with an inner annular flange for pressing a circumference of the outer cover to retain the outer cover.

11. The straight-through rotary valve structure as claimed in claim 5, wherein an outer thread is formed on an outer circumference of the opening of the case and an inner thread is formed on an inner circumference of the retainer ring, the inner thread of the retainer ring being screwed on the outer thread of the case.

12. The straight-through rotary valve structure as claimed in claim 6, wherein an outer thread is formed on an outer circumference of the opening of the case and an inner thread is formed on an inner circumference of the retainer ring, the inner thread of the retainer ring being screwed on the outer thread of the case.

13. The straight-through rotary valve structure as claimed in claim 7, wherein an outer thread is formed on an outer circumference of the opening of the case and an inner thread is formed on an inner circumference of the retainer ring, the inner thread of the retainer ring being screwed on the outer thread of the case.

14. The straight-through rotary valve structure as claimed in claim 8, wherein an outer thread is formed on an outer circumference of the opening of the case and an inner thread is formed on an inner circumference of the retainer ring, the inner thread of the retainer ring being screwed on the outer thread of the case.

15. The straight-through rotary valve structure as claimed in claim 1, wherein a locating recess is formed on an inner circumference of the opening of the case and a complementary locating protrusion is formed on a circumference of the outer cover, whereby the locating protrusion can be inlaid in the locating recess.

16. The straight-through rotary valve structure as claimed in claim 2, wherein a locating recess is formed on an inner circumference of the opening of the case and a complementary locating protrusion is formed on a circumference of the outer cover, whereby the locating protrusion can be inlaid in the locating recess.

17. The straight-through rotary valve structure as claimed in claim 3, wherein a locating recess is formed on an inner circumference of the opening of the case and a complementary locating protrusion is formed on a circumference of the outer cover, whereby the locating protrusion can be inlaid in the locating recess.

18. The straight-through rotary valve structure as claimed in claim 7, wherein a locating recess is formed on an inner circumference of the opening of the case and a complementary locating protrusion is formed on a circumference of the outer cover, whereby the locating protrusion can be inlaid in the locating recess.

19. The straight-through rotary valve structure as claimed in claim 9, wherein a locating recess is formed on an inner circumference of the opening of the case and a complementary locating protrusion is formed on a circumference of the outer cover, whereby the locating protrusion can be inlaid in the locating recess.

20. The straight-through rotary valve structure as claimed in claim 11, wherein a locating recess is formed on an inner circumference of the opening of the case and a complementary locating protrusion is formed on a circumference of the outer cover, whereby the locating protrusion can be inlaid in the locating recess.

\* \* \* \* \*